United States Patent [19]

Severns et al.

[11] 3,717,451

[45] Feb. 20, 1973

[54] FLUIDIZED BED TREATMENT OF PHOSPHORUS-CONTAINING PRECIPITATOR DUST

[75] Inventors: Richard Ray Severns; James Kirk Sullivan; Lynn Coulson Simmons, all of Pocatello, Idaho

[73] Assignee: IMC Corporation, New York, N.Y.

[22] Filed: Oct. 6, 1970

[21] Appl. No.: 78,449

[52] U.S. Cl. .................................... 71/33, 71/64 DB
[51] Int. Cl. ............................................ C05b 17/02
[58] Field of Search.....23/165 A, 223; 71/25, 32, 33, 71/64 DB

[56] References Cited

UNITED STATES PATENTS

| | | |
|---|---|---|
| 2,974,016 | 3/1961 | Horton et al. ...........................23/223 |
| 2,135,486 | 11/1938 | Almond..................................23/223 |
| 2,613,134 | 10/1952 | Elmore...............................23/165 A |
| 2,713,536 | 7/1955 | Driskell...............................71/32 X |
| 3,364,008 | 1/1968 | Hollingsworth et al. ...........71/64 DB |
| 1,463,959 | 8/1923 | Klugh...............................23/165 A |
| 1,594,372 | 8/1926 | Liljenroth..........................23/165 A |
| 3,077,382 | 2/1963 | Klein et al. .......................23/165 A |

Primary Examiner—John Adee
Attorney—Thomas B. Graham, Eugene G. Seems and Frank Ianno

[57] ABSTRACT

A process for drying, granulating and oxidizing phosphorus-containing precipitator dust which comprises charging an aqueous slurry of said dust onto a fluidized bed of granular precipitator dust particles thereby coating said particles with the slurry; utilizing the heat from the fluidizing gases to evaporate the slurry liquid and, simultaneously, to oxidize the phosphorus present in the slurry; and recovering the dry, particulate granules.

6 Claims, 2 Drawing Figures

PATENTED FEB 20 1973  3,717,451

INVENTORS
RICHARD RAY SEVERNS
JAMES KIRK SULLIVAN
BY  LYNN COULSON SIMMONS

ATTORNEY

FLUIDIZED BED TREATMENT OF PHOSPHORUS-CONTAINING PRECIPITATOR DUST

BACKGROUND OF THE INVENTION

Phosphorus occurs in nature mainly in minerals based on calcium phosphate. The elementary phosphorus is recovered from the mineral by heating the calcium phosphate with silica (sand) and carbon (coke). The silica forms calcium silicate displacing phosphorus pentoxide, which is then reduced by the carbon i.e.

$$Ca_3(PO_4)_2 + 3SiO_2 \rightarrow 3CaSiO_3 + P_2O_5$$

$$P_2O_5 + 5C \rightarrow 2P + 5CO$$

The phosphorus leaves the furnace as a vapor which is condensed with water to form white phosphorus.

In the operation of electric phosphorus furnaces, fumes are evolved from the furnaces that are collected and cleaned by electrostatic precipitation. The dust resulting from this operation is mixed with water and then pumped to waste ponds. Inasmuch as this precipitator dust contains valuable constituents, e. g. $P_2O_5$, $K_2O$, as well as silver, zinc and cadmium metals, a method which provides for the recovery of this material in a usable and safe form is highly desirable.

Previous recovery attempts have been replete with difficulties stemming mainly from the presence of either elemental phosphorus or an oxidizable phosphorus compound in the dust. Thus, these materials can burn spontaneously at any point in the recovery procedure including during preliminary handling of the dust. Furthermore, the heat utilized in dry recovery techniques has resulted in the dust catching fire and forming a sticky, lumpy mass of fused material as well as in the emission of large volumes of objectionable $P_2O_5$ fumes. Wet recovery methods have been plagued with similar problems in view of the necessity for eventually heat drying the collected slurry. An attempt to eliminate the drying problem by combining the precipitator dust with calcined phosphate fines which serve as a diluent to prevent ring formation in the drier caused by the fusion of the dust, has also been unsuccessful inasmuch as the dilution has affected the analysis of the recovered product to the point where it was no longer of any value.

SUMMARY OF THE INVENTION

It is the primary object of this invention to provide a convenient, efficient process for recovering precipitator dust from phosphorus furnaces.

It is a further object to recover the dust in a dry, granular form which is substantially free of phosphorus-containing materials.

It is still a further object to conduct this process in a single operation.

Various other objects and advantages of this invention will be apparent from the following detailed description thereof.

We have now discovered that it is possible to recover precipitator dust from phosphorus furnaces in a usable and safe form by utilizing a fluidized bed drying technique. Thus, the process is one whereby a fluidized bed drier is utilized to dry an aqueous slurry of phosphorus-containing dust, oxidize the phosphorus contained therein and ultimately produce a granular product. Furthermore, this process substantially overcomes the problems of dust fusion, $P_2O_5$ emission and product dilution which were encountered in the prior art recovery techniques.

This novel invention will be better understood from the following detailed description thereof together with the accompanying drawings in which:

FIG. 1 is a cross-sectional view of a fluidized bed apparatus which is suitable for use in the novel process of this invention; and FIG. 2 is a flow diagram of a total recovery system which may be utilized to conduct the process.

DESCRIPTION OF THE PREFERRED EMBODIMENTS

Figures 1, 2:
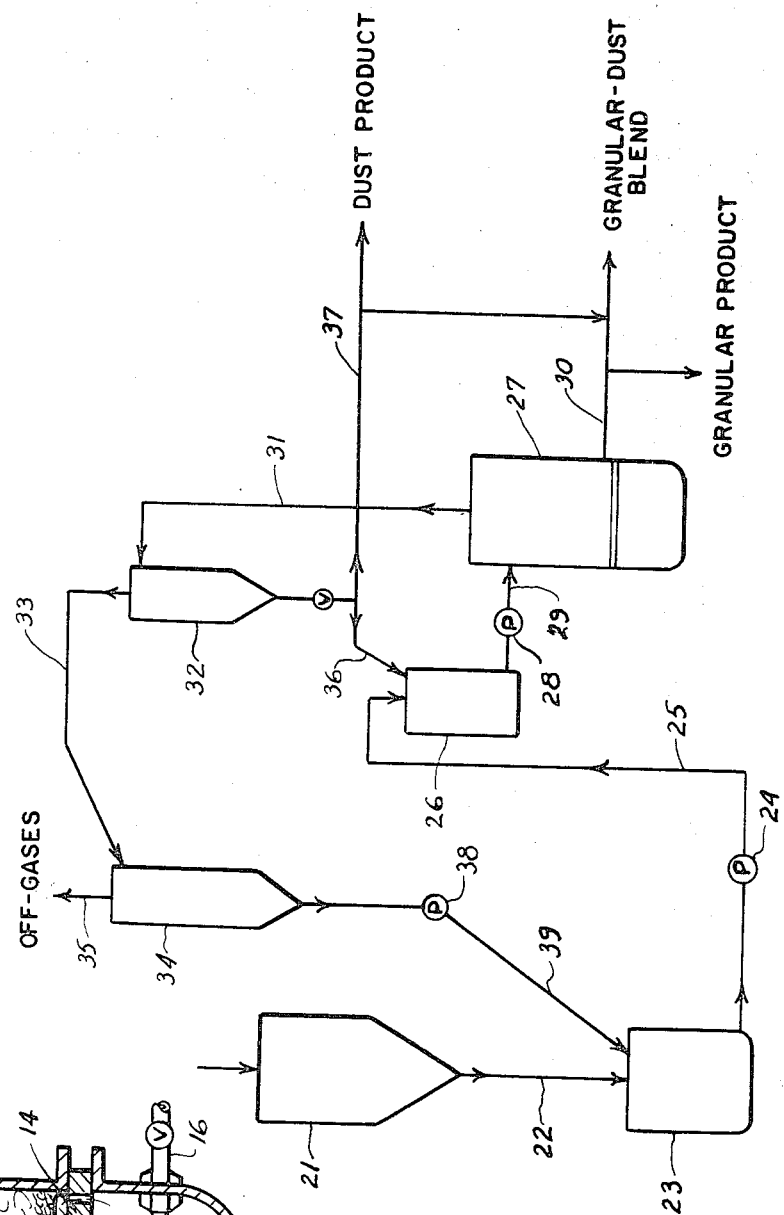

A fluidized bed is, by definition, a mass of solid particles which exhibits the liquid-like characteristics of mobility, hydrostatic pressure, and an observable upper free surface or boundary zone across which a marked change in concentration of particles occurs. This "fluidized bed" is defined as differing from a "dispersed suspension" inasmuch as in the latter, an upper level or interface is not formed under conditions of continuous solids entrainment and uniform superficial velocity. Thus, in general, a dispersed suspension is analogous to a vapor, whereas a fluidized bed is analogous to a liquid.

The objectives of this invention are accomplished by charging a fluidized bed of granular precipitator dust particles with an aqueous slurry of precipitator dust, thereby providing a coating of slurry on the particles. The heat supplied by the fluidizing gases causes the slurry liquid to evaporate and any oxidizable phosphorus present in the slurry to be burned. The resulting product is a dry, phosphorus-free granule.

With regard to specifics of the fluidized bed assembly, the aqueous slurry of precipitator dust is prepared by blending water with the dust collected from electrostatic precipitators that clean the gases generated during electric furnace phosphorus smelting. The concentration of solids in the slurry feed should range from about 5 to 50 percent, by weight, and preferably from about 5 to 20 percent. The solids content becomes critical at the higher levels because of the increased viscosity of the slurry at these levels and the tendency to form lumps within the fluidized bed. These lumps, being larger than the bed granules, settle by gravity onto the porous partition or grid plate. Eventually, these deposited lumps fuse together and cause complete bed fusion by disrupting the even distribution of fluidizing gases throughout the bed.

Furthermore, the phosphorus concentration in the slurry resulting from the presence of either elemental phosphorus or an oxidizable phosphorus compound should not exceed about 10 percent, on a dry basis, and preferably not exceed about 5 percent. Concentrations which exceed this 10 percent level are generally not workable inasmuch as the burning of such excessive amounts of phosphorus in the fluidized bed causes the individual granules to become coated with a sticky material. This sticky coating, in turn, causes the granules to adhere to one another, thereby resulting in dissipated fluidization and bed fusion.

The solid particles utilized in the bed are phosphorus-free granules of precipitator dust which are produced during the course of the granulation procedure. Initially, inert solid particles such as sand are utilized to receive the aqueous slurry and provide a foundation for subsequent granule growth. Thereafter, the seeds for the granule growth in the fluidized bed are provided by the smaller coated precipitator dust particles, coarse particles which may be present in the aqueous slurry, and quickly dried dust particles which assume the shape of hollow spheres. These seed particles are coated with additional layers of dried slurry until the system reaches a point of equilibrium, i.e. new particles are being generated at a rate equal to the rate at which the product is no longer supported in a fluidized state and thus drops to be removed from the system.

The bed granules generally exhibit the following component analysis: 28% $P_2O_5$, 21% $K_2O$, 9% CaO, 14% $SiO_2$, 6% Zn, 5' F and 17% of miscellaneous compounds including silver and cadmium. In order to be most effective as seeds, these particles should exhibit and average particle size ranging from about 0.25 to 4.75 millimeters. Ultra-fine particles are undesirable inasmuch as they do not form stable beds and they tend to agglomerate to form large masses of solids. These effects result in a channeling of the fluidizing gases through the bed and also in non-uniform fluidization of the bed. Extremely coarse particles, on the other hand, are undesirable because of the relatively high gas velocity required to maintain them in a fluidized condition. The appropriately sized particles are readily placed in a fluidized state and, therefore, are capable of creating excellent temperature uniformity throughout the bed.

Any gas which is reasonably inert at the temperatures, and with the materials employed, may be utilized as the gaseous medium for fluidizing the bed particles. Air is usually satisfactory and is preferred for economy. The pressure and flow rates of the gas may vary greatly, depending on the shape and volume of the bed container, the nature of the porous plate, and the nature of the feed and bed components. The pressure and flow rate should, however, be sufficient to agitate the fluidized bed and develop attrition between the granules in order to prevent them from fusing together, to attain the appropriate temperature uniformity throughout the bed, and help entrain the volatiles emanating from the bed.

With regard to the operating conditions of the bed during the granulation process, the various parameters may be determined by the practitioner in accordance with his particular system. Typical operating parameters include a feed rate of the slurry ranging from about 100 to 250 pounds/hour/square foot; a bed depth ranging from about 1 to 4 feet; and, a fluidizing velocity ranging from about 4 to 8 feet/second. The temperature of the bed should be sufficient to evaporate the slurry liquid and to burn off the phosphorus present in the slurry. Accordingly, typical bed temperatures range from about 200° to 450° c., with 350° C. being the optimum bed temperature. The elapsed time between introduction of the aqueous slurry and recovery of phosphorus-free granular product will generally range from about 3 to 25 hours.

The typical fluidizing apparatus for conducting the novel process of this invention, as depicted in FIG. 1, generally includes a container 11 of suitable dimensions being horizontally divided into an upper and lower chamber 12 and 13, respectively, by means of a porous partition 14. This partition 14, which should be pervious to the gas used in the system but impervious to the bed granules, may take the form of a stainless grid plate equipped with bubble caps 17, although other similar structures such as a porous ceramic plate or a stainless annulus welded to a stainless steel micropore filter plate may be used. The porous plate will generally have a gas permeability which will allow the passage of from 1 to 15 cubic feet of air at 70° F. through an area of 1 square foot and a plate thickness of 1 inch. The average pore diameter of the porous plate will generally be in the range of from about 0.003 to 0.004 of an inch or less.

The granular bed particles 15 are placed on the upper surface of the partition 14. Thereafter, the gas under pressure is introduced into the lower chamber 13 of the container 11 through air inlet 16. The lower chamber 13 houses a burner, fuel intake and a wind box, not depicted in the figure, which serve to heat the fluidizing gases and to force them through the partition 14, into the solid particles 15, causing the particles to be converted into a continuously fluidized bed.

It is very desirable that the gas should pass through the grid plate through many small, closely-spaced pores in very minute gas steams emanating from such pores. Accordingly, it is important that there be some appreciable degree of resistance to the gas flow through every portion of the porous plate and a measurable pressure drop across the porous plate so as to assure that there be an equalization of pressure on the bottom of the plate and a resulting even flow and equal flow through all portions thereof. It will be seen, therefore, that the many tiny streams of gas which are flowing through the individual pores of the porous plate, when considered in combination, comprise an upwardly moving column of gas, all of the components of which are moving upwardly at substantially uniform parallel speeds.

As previously indicated, the fluidized bed behaves substantially as a fluid. Thus, the individual particles in the bed become separated from one another and the bed appears to expand to occupy a greater volume, thereby rising to an equilibrium level within the container. The bed particles are thereby in a position to be uniformly coated by the feed slurry as well as to be uniformly exposed to the heated gases for the drying and oxidation operations.

It should be noted that the depicted apparatus does not represent the sole means for effecting the novel process of this invention. Thus, variations may be made which comprise simplification of the apparatus, substitution for certain elements thereof, or additions to the basic system; it merely being necessary that the resulting apparatus be capable of accomplishing the basic objectives of the invention. For example, the fluidizing gases may be heated by means of extraneous thermostatically controlled heaters, heating coils which surround the gas transmitting lines, or heating elements actually inserted into the fluidized bed. Furthermore, the fluidized effect may be achieved by the introduction of gas in conjunction with external agitation of the bed.

While the fundamental operations of the novel process of this invention are conducted solely in the fluidized bed, the fluidizing apparatus is only one phase of a total system which may be assembled in order to prepare and transfer the slurry feed, recover the granular product and handle the by-products of the process. Such a system is depicted in FIG. 2.

Thus, the fumes which emanate from the phosphorus furnaces are collected and cleaned in electrostatic precipitator 21. The collected phosphorus-containing precipitator dust is passed via line 22 to slurry mixing tank 23 where the dust is mixed with water to produce a slurry of the appropriate solids content. The resulting slurry is then pumped by pump 24 via line 25 to the feed tank 26 wherein the slurry, while under agitation, is stored preparatory to being fed into the fluidized bed 27. This transfer is accomplished by pump 28 via line 29 at the prescribed feed rate. As previously indicated, the feed slurry coats the granular precipitator dust particles which comprise the fluidized bed, whereupon the heat supplied by the fluidizing gases evaporates the slurry liquid and oxidizes any phosphorus contained in the slurry. The resulting dry, phosphorus-free granules are then removed from the bottom of the fluidized bed 27 via line 30.

The off gases emanating from the fluidized bed 27, are then passed via line 31 into a cyclone 32 wherein 90 − 99 percent of the entrained dust is removed. Since the cyclone is not totally efficient in removing the fine dust, the cleaned off gases are further passed via line 33 into a wet scrubber 34 in order to remove any residual dust, $P_2O_5$ fumes, or other undesirable gaseous components. The resulting off gases are then vented via line 35 and passed to the stack.

The fine dust collected in the cyclone 32 may be disposed of in one of several ways. Thus, the dust may be returned via line 36 to the feed tank 26 for blending with the feed slurry, transfer to the fluidized bed 27 and eventual conversion into the granular product. Alternatively, the dust may be passed via line 37 to be blended with the granular product in proportions ranging from 1 : 9 to 9 : 1 and marketed as a phosphorus-free combined product. In addition, the dust may be removed via line 37 and collected as a distinct product.

Furthermore, the slurry collected from wet scrubber 34 may be recycled by pump 38 via line 39 to the slurry mixing tank 23 to be used as make-up water in the preparation of the aqueous dust slurry.

It is thus seen that the novel process of this invention provides almost total recovery of the precipitator dust in the preparation of dry, phosphorus-free granular products. The resulting granular products may be utilized in a variety of applications including use as fertilizers, fertilizer additives, or as feed stock for recovering the useful components in the granules, e.g. $P_2O_5$, $K_2O$, silver, zinc or cadmium.

By way of specific illustration of the novel process of this invention, precipitator dust containing 4 percent elemental phosphorus, on a dry weight basis, was mixed with water to prepare an aqueous slurry having a solids content of 15 percent, by weight. The resulting aqueous slurry was then charged at a rate of 170 pounds/hour/square foot, onto a fluidized bed of granular precipitator dust particles in a fluidizing apparatus similar to the one depicted in FIG. 1. The granular particles, which were positioned on the upper surface of a stainless grid plate equipped with bubble caps, exhibited a particle size which ranged between 0.25 and 4.75 millimeters and were essentially devoid of phosphorus-containing materials. These particles were placed in a fluidized state by heated air which was passed into the particles through the stainless grid plate at a velocity of six feet per second. The depth of the bed was thus established at approximately 1.5 feet and the temperature uniformly maintained at 350° C.

The aqueous slurry which was charged onto the fluidized bed formed a thin coating on the granules. The heat supplied by the fluidizing air served to evaporate the slurry liquid leaving a thin coating, i.e. 30 mils, of dried dust on the granule. It also served to oxidize the elemental phosphorus present in the slurry. There was no evidence of granule fusion or lump formation during the entire operation.

Analysis of the resulting dry, precipitator dust granules revealed the total absence of elemental phosphorus. These granules were thus prepared in safe and usable form.

Summarizing, it is seen that this invention provides a novel process for converting phosphorus-containing precipitator dust into safe and functional phosphorus-free granules.

Variations may be made in procedures, proportions and materials without departing from the scope of the invention as defined by the following claims.

What is claimed is:

1. A process for convering the precipitator dust carrying elemental phosphorus as by-product of a phosphorus smelting operation to an essentially elemental phosphorus-free granular products, said process comprising the steps of:

1. mixing said precipitator dust containing a maximum elemental phosphorus content of about 10 percent, on a dry weight basis, with water to prepare an aqueous slurry thereof;
2. charging said aqueous slurry onto a heated bed of essentially phosphorus-free, granular precipitator dust particles maintained in fluidized condition, thereby coating said particles with the slurry;
3. maintaining said coated particles in the heated fluidized environment with a stream of hot oxidizing gas and holding said heated environment at a temperature of about 200°–450° C. in order to evaporate the slurry liquid and oxidize the elemental phosphorus content thereof; and
4. recovering said granular product essentially free of elemental phosphorus, containing oxidized phosphorus.

2. The process of claim 1, wherein said aqueous slurry has a solids content ranging from 5 to 50 percent, by weight.

3. The process of claim 1, wherein said bed particles have an average particle size of from about 0.25 to 4.75 millimeters.

4. The process of claim 1, wherein said fluidizing and heating of the bed particles are accomplished by passing an ascending current of hot oxidizing gas through the mass of particles, wherein said fluidized bed temperature ranges from about 200° to 450° C.

5. The process of claim 1, wherein the entrained dust present in the gases emanating from the fluidized bed is isolated and blended with said granular product to produce a granule-dust combined product essentially free of elemental phosphorus.

6. The process of claim 1, wherein the entrained dust present in the gases emanating from the fluidized bed are isolated and blended with the aqueous slurry for recirculation through the heated fluidized bed.

* * * * *

UNITED STATES PATENT OFFICE
CERTIFICATE OF CORRECTION

Patent No. 3,717,451   Dated February 20, 1973

Inventor(s) Richard Ray Severns et al

It is certified that error appears in the above-identified patent and that said Letters Patent are hereby corrected as shown below:

Page 1 under Assignee "IMC" should read --FMC--.

Column 3, line 18 "5'F" should read --5%F--.

Column 3, line 60 "450°c." should read --450°C.--.

Signed and sealed this 31st day of December 1974.

(SEAL)
Attest:

McCOY M. GIBSON JR.
Attesting Officer

C. MARSHALL DANN
Commissioner of Patents